US006834297B1

(12) United States Patent
Peiffer et al.

(10) Patent No.: US 6,834,297 B1
(45) Date of Patent: Dec. 21, 2004

(54) WEB RESOURCE TRANSFER ACCELERATION SYSTEM AND METHOD

(75) Inventors: Christopher Peiffer, Menlo Park, CA (US); Israel L'Heureux, Menlo Park, CA (US)

(73) Assignee: Redline Networks, Inc., Campbell, CA (US)

( * ) Notice: Subject to any disclaimer, the term of this patent is extended or adjusted under 35 U.S.C. 154(b) by 614 days.

(21) Appl. No.: 09/680,675

(22) Filed: Oct. 6, 2000

(51) Int. Cl.$^7$ .............................. G06F 13/00
(52) U.S. Cl. .................. 709/219; 709/225; 709/247
(58) Field of Search ................ 709/703, 217, 709/219, 223, 225, 246, 247, 203

(56) References Cited

U.S. PATENT DOCUMENTS

| | | | |
|---|---|---|---|
| 5,727,159 A | | 3/1998 | Kikinis |
| 5,864,366 A | | 1/1999 | Yeo |
| 5,918,013 A | | 6/1999 | Mighdoll et al. |
| 6,029,182 A | | 2/2000 | Nehab et al. |
| 6,049,342 A | | 4/2000 | Nielsen et al. |
| 6,049,821 A | * | 4/2000 | Theriault et al. ........... 709/203 |
| 6,058,428 A | | 5/2000 | Wang et al. |
| 6,081,835 A | | 6/2000 | Antcliff et al. |
| 6,092,099 A | | 7/2000 | Irie et al. |
| 6,122,666 A | | 9/2000 | Beurket et al. |
| 6,128,655 A | | 10/2000 | Fields et al. |
| 6,157,924 A | | 12/2000 | Austin |
| 6,247,048 B1 | | 6/2001 | Greer et al. |
| 6,266,369 B1 | | 7/2001 | Wang et al. |
| 6,275,301 B1 | | 8/2001 | Bobrow et al. |
| 6,275,829 B1 | | 8/2001 | Angiulo et al. |
| 6,304,676 B1 | | 10/2001 | Mathews |
| 6,311,223 B1 | | 10/2001 | Bodin et al. |
| 6,332,131 B1 | | 12/2001 | Grandcolas et al. |
| 6,345,279 B1 | | 2/2002 | Li et al. |
| 6,563,517 B1 | | 5/2003 | Bhagwat et al. |
| 6,578,073 B1 | * | 6/2003 | Starnes et al. .............. 709/219 |
| 6,601,108 B1 | | 7/2003 | Marmor |
| 6,615,266 B1 | | 9/2003 | Hoffman et al. |
| 6,631,298 B1 | | 10/2003 | Pagnano et al. |

FOREIGN PATENT DOCUMENTS

| | | |
|---|---|---|
| JP | 10-224523 | 8/1998 |
| JP | 10-254888 | 9/1998 |
| JP | 10-285502 | 10/1998 |
| JP | 10-301943 | 11/1998 |

OTHER PUBLICATIONS

International Search Report, PCT/US01/27164, issued Oct. 31, 2001.
International Search Report, PCT/US01/41953, issued Dec. 13, 2001.
Office action in U.S. patent application Ser. No. 09/680,998, issued Nov. 5, 2003.
Office action in U.S. patent App. Ser. No. 09/680,997, issued Nov. 10, 2003.
International Search Report, PCT/US01/42476, issued Nov. 19, 2001.
Mohan R., Smith J.R., Content Adaptation Framework, IEEE; Global Telecommunications Network, 1999, vol. 4. pp. 2015–2021.

(List continued on next page.)

*Primary Examiner*—Viet D. Vu
(74) *Attorney, Agent, or Firm*—Kolisch Hartwell, P.C.

(57) ABSTRACT

A system, method, and device for computer networking. According to one embodiment of the invention, the method includes receiving from a remote client a request for a web resource containing renderable and non-renderable data. The method further includes filtering at least a portion of the non-renderable data from the requested web resource, thereby creating a modified web resource. The method also includes sending the modified web resource to the remote client. Non-renderable data may include whitespace, comments, hard returns, meta tags, keywords, or other data not used by a browser to present a web page.

82 Claims, 15 Drawing Sheets

OTHER PUBLICATIONS

Bharadvaj H., Joshi A., An Active Transcoding Proxy to Support Mobile Web Access, IEEE Symposium; Reliable Distributed Systems, Oct. 1998, pp. 118–123.

Spyglass, Inc., http://www.spyglass.com, http://webarchive.org/web/19990429034543/http://www.spyglass.com, Apr. 29, 1999.

* cited by examiner

FILTERED WEB PAGE SOURCE DATA WITH LINK TO SMALLER VERSION OF IMAGE  32a

<html><head><title>Sample Page</title><meta name="Author" content="Keyword1 Keyword2 Keyword3"></head><body><center><a href="http://www.redlinenetworksremoteserver.com/sampleimages/information.html"> <img src=" http://www.redlinenetworksremoteserver.com/sampleimages/RemotelyServedImage.gif" 36k align=middle alt="Remotely Served Image"></a></center><h1 align=center>Sample Web Page</h1><img src="www.redlinenetworks.com/images/OriginalImage.gif?THIN" align=left> Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text </body></html>

FIG. 18

FILTERED WEB PAGE SOURCE DATA WITH LINK TO ORIGINAL VERSION OF  32a'
IMAGE

<html><head><title>Sample Page</title><meta name="Author" content="Keyword1 Keyword2 Keyword3"></head><body><center><a href="http://www.redlinenetworksremoteserver.com/sampleimages/information.html"> <img src=" http://www.redlinenetworksremoteserver.com/sampleimages/RemotelyServedImage.gif" 36m align=middle alt="Remotely Served Image"></a></center><h1 align=center>Sample Web Page</h1><img src="www.redlinenetworks.com/images/OriginalImage.gif?FAT" align=left> Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text </body></html>

FIG. 19

WEB RESOURCE TRANSFER ACCELERATION SYSTEM AND METHOD

CROSS-REFERENCE TO RELATED APPLICATIONS

This application is related to U.S. patent application Ser. No. 09/680,997, entitled IMAGE TRANSFER SYSTEM AND METHODS filed Oct. 6, 2000 by Inventors Christopher Peiffer and Israel L'Heureux, and also to U.S. patent application Ser. No. 09/680,998, entitled WEB PAGE SOURCE DATA TRANSFER SYSTEM AND METHOD, also filed on Oct. 6, 2000 by inventors Christopher Peiffer and Israel L'Heureux.

TECHNICAL FIELD

The present invention relates generally to data transmission on computer networks, and more particularly to acceleration of transmission of a web resource over a computer network.

BACKGROUND OF THE INVENTION

The Internet has experienced explosive growth in recent years. The emergence of the World Wide Web has enabled millions of users around the world to download easily web pages containing text, graphics, video, and sound data while at home, work, or from remote locations via wireless devices. These web pages often are large in size and therefore require a long time to download, causing the user delay and frustration. Delay often causes users to abandon the requested web page and move on to another web page, resulting in lost revenue and exposure for many commercial web sites.

Delay downloading a web page can be caused by a number of factors. At the server, a large volume of page requests may overload the capacity of the server and result in unanswered or late-answered requests. Within the computer network, network congestion and limited bandwidth may cause delay in the transmission of data. Particularly problematic is the so-called "last mile" between many home users and their Internet Service Provider. For a majority of Internet users, the last mile is typically a telephone modem connection configured to operate at speeds at or lower than 56K baud. For these users, large web pages take an agonizingly long time to download.

It would be desirable to provide a system and method for accelerating data transmission over a computer network, in order to decrease delay and provide users with more pleasurable experience.

SUMMARY OF THE INVENTION

A system, method, and device for computer networking are provided. The method typically includes receiving a request for a web resource from a remote client and obtaining an original web resource corresponding to the requested web resource. The method further typically includes processing at least a portion of the original web resource to form a size-optimized web resource having a smaller file size than the original web resource. The method also typically includes sending the size-optimized web resource to the remote client, and sending at least the portion of the original web resource that was size-optimized to the remote client in an original, unmodified state. The web resource may be image data, web page source data, or other web resource.

According to another aspect of the invention, the method includes receiving a request for a web resource from a remote client. The web resource typically contains renderable and non-renderable data. The method further includes filtering at least a portion of the non-renderable data from the requested web resource, thereby creating a modified web resource. The method also includes sending the modified web resource to the remote client. Non-renderable data may include whitespace, comments, hard returns, meta tags, keywords, or other data not used by a browser to present a web page.

According to another aspect of the invention, the method includes receiving a request for web resource from a remote client and, in real-time, creating a modified web resource based on the requested web resource. The modified web resource is typically smaller in size than the requested web resource. The method further includes sending the modified web resource to the remote client.

The device typically is for use on a computer network having a web server and a remote client. The remote client is configured to download a web resource from the web server via the computer network. The device typically includes a controller configured to receive a request for the web resource from the remote client, and in response, obtain the requested web resource from the web server. The controller is further configured to accelerate transmission, in real time, of the web resource from the web server to the remote client via the computer network. The requested web resource may include non-renderable data, and the controller may be configured to filter out at least a portion of the non-renderable data, thereby accelerating the transmission of the web resource to the remote client via the computer network.

According to another aspect of the invention, the device includes a controller configured to receive a request for a web resource from a remote client on a computer network, obtain the web resource from an associated web server, compress the web resource in real time, and send the compressed web resource to the remote client.

The system typically includes a computer network, a web server, and a remote client configured to download a web resource from the web server via the computer network. The system further typically includes an acceleration device positioned intermediate the web server and the remote client on the computer network. The acceleration device is configured to accelerate transmission of the web resource from the web server to the remote client. The web resource may be web page source data, image data, or other file. The acceleration device typically accelerates transmission of web page source data by filtering at least a portion of the non-renderable data from the web page source data. The acceleration device typically accelerates transmission of image data by creating a smaller version of the image data and sending the smaller version to the remote client. An original version of the image data may be sent to the remote client following the smaller version. The web resource also may be compressed by the acceleration device before transmission.

BRIEF DESCRIPTION OF THE DRAWINGS

FIG. 18 is a listing of filtered web page source data including a hyperlink to a smaller version of an inline image, filtered according to one embodiment of the present invention.

FIG. 19 is a listing of the filtered web page source data of FIG. 18, rewritten to include a hyperlink to an original version of the inline image.

DETAILED DESCRIPTION OF THE INVENTION

Figure 1:
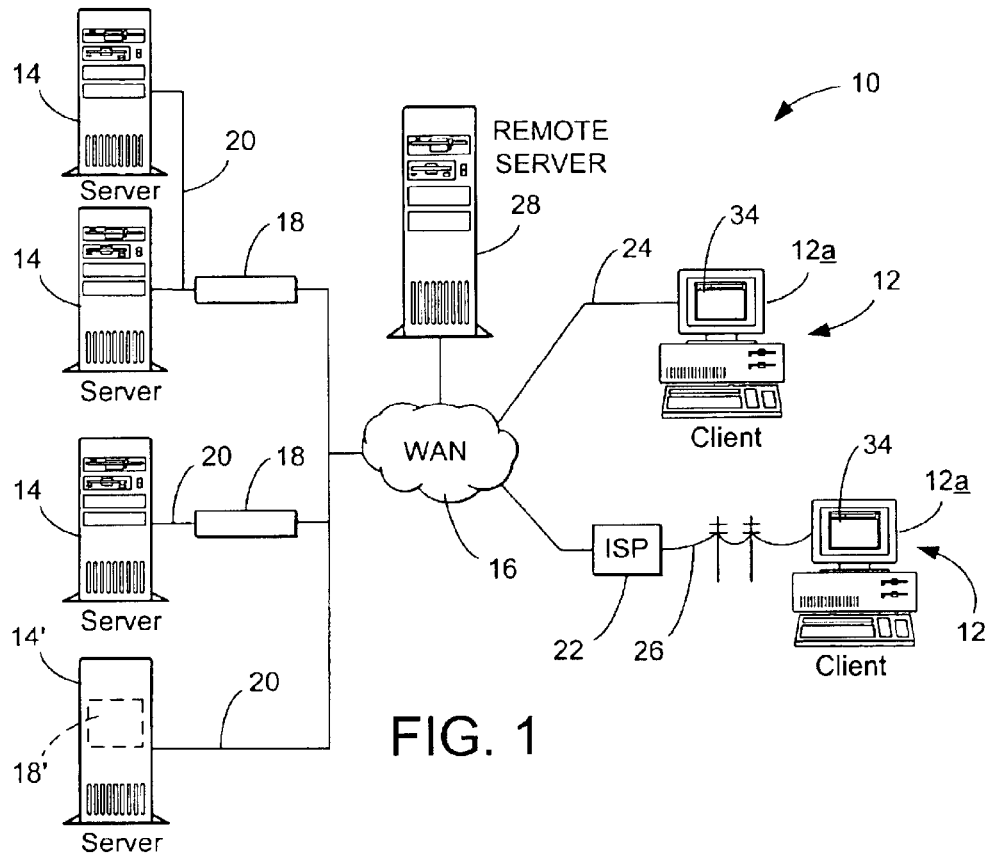
FIG. 1 is a schematic view of a network data acceleration system according to one embodiment of the present invention.

Referring initially to FIG. 1, a computer networking system according to one embodiment of the present invention is shown generally at 10. System 10 typically includes a plurality of remote clients 12 configured to download data from servers 14 via computer network 16. Remote clients 12 are typically computing devices, such as personal computers (PCs), portable data assistants (PDAs), web-enabled wireless telephones, mainframe computers, etc.

System 10 further includes an acceleration device 18 positioned intermediate each of remote clients 12 and servers 14. Acceleration device 18 is configured to accelerate the transmission of data between the server 14 and remote client 12. Acceleration device 18 is alternatively referred to herein as networking device 18.

Typically, acceleration devices 18 are stand-alone appliances linked to computer network 16. According to an alternative embodiment of the invention, system 10 may include an acceleration device 18' integrated into server 14'. Acceleration devices 18 may be connected to servers 14 in a one-to-one relationship, or in a one-to-many relationship, as shown. When one acceleration device 18 is linked to several servers 14, it functions to distribute requests from remote clients 12 to the many servers 14, thereby approximately balancing the load placed on each of the servers.

Typically, acceleration devices 18 are connected to servers 14 via Local Area Networks (LANs) 20, and are connected to remote clients 12 via computer network 16, which is typically a Wide Area Network 16, such as the Internet. Remote clients 12 may be connected to WAN 16 directly via a broadband connection 24, or via an Internet Service Provider (ISP) 22. Typically, remote client 12 and ISP 22 are linked via a modem connection through the Public Switched Telephone Network (PSTN) 26. A typical operating speed for the PSTN modem connection 26 is approximately 56K bits per second (bps) or less, while a typical operating speed for direct broadband connection 24 is between about 256K bps to 10 Megabits per second, and may be higher.

Figure 15:
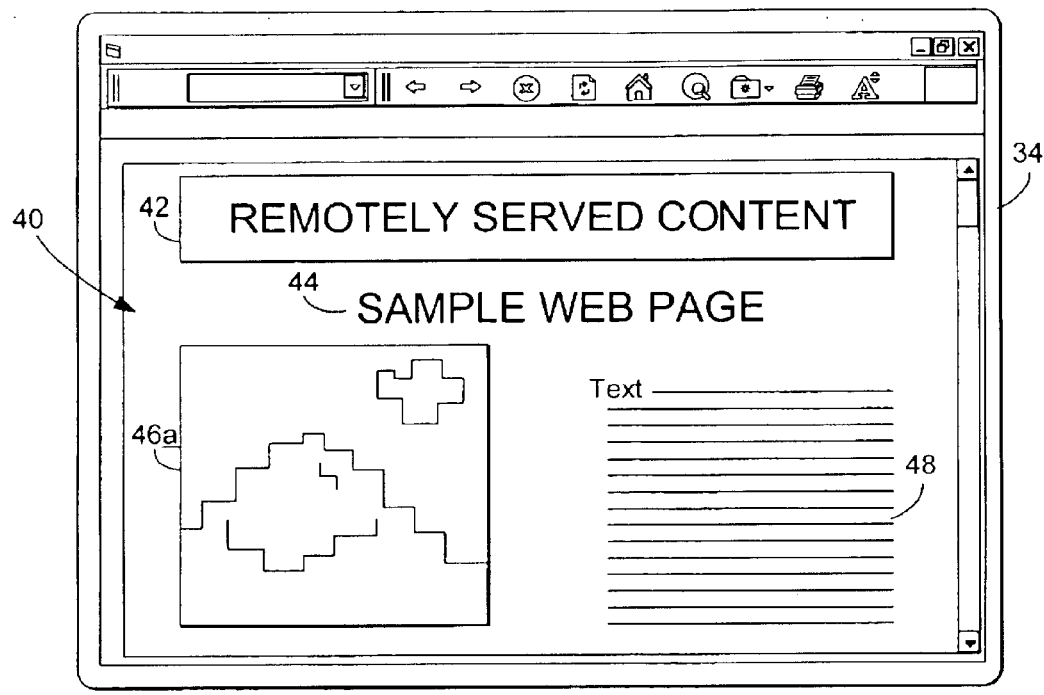
FIG. 15 is a web page according to one embodiment of the present invention, shown with a smaller version of the image data.
Figure 16:
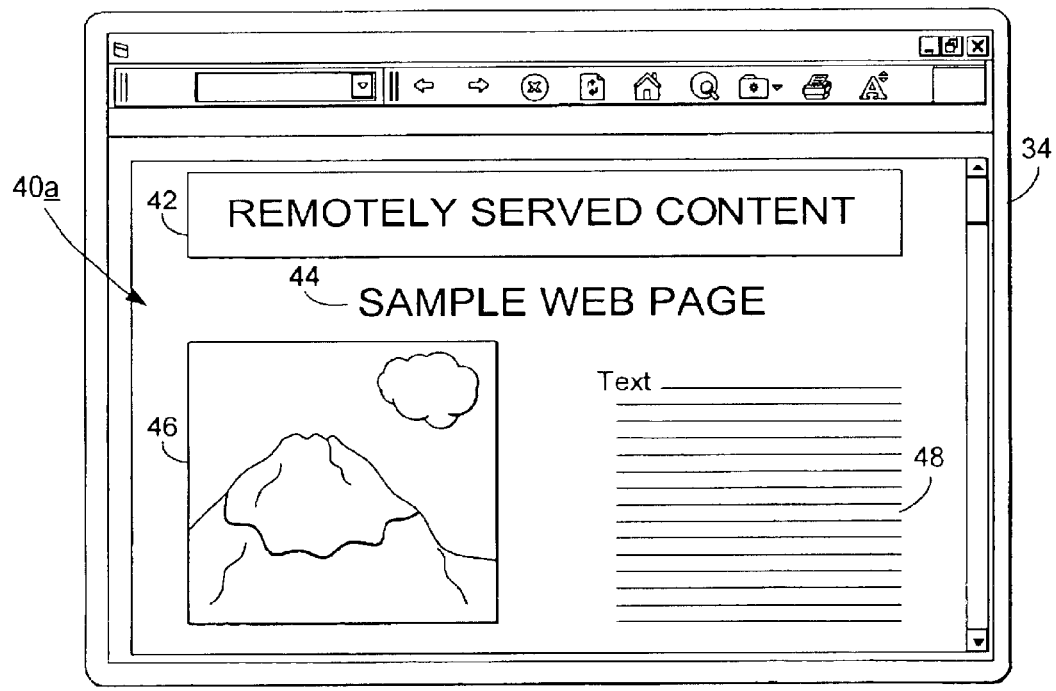
FIG. 16 is the web page of FIG. 15, shown with an original, unmodified version of the image data of FIG. 15.

A remote server 28 may be provided to serve additional data to remote clients 12 via computer network 16. This data is referred to herein as remotely served content, and in the case where web server 14 and remote server 28 are operated by different content providers, may be referred to herein as third-party content. Remotely served content is shown in FIGS. 15 and 16 at 42. Typically, remote server 28 is an advertising server 28 configured to serve an advertisement to remote client 12. In addition to advertising, it will be appreciated that the remotely served content may be virtually any other type of information, such as news, weather, stock quotes, etc., and may contain graphics, text, images, video, and/or sounds. The function of remote server 28 will be further described below.

Figure 14:
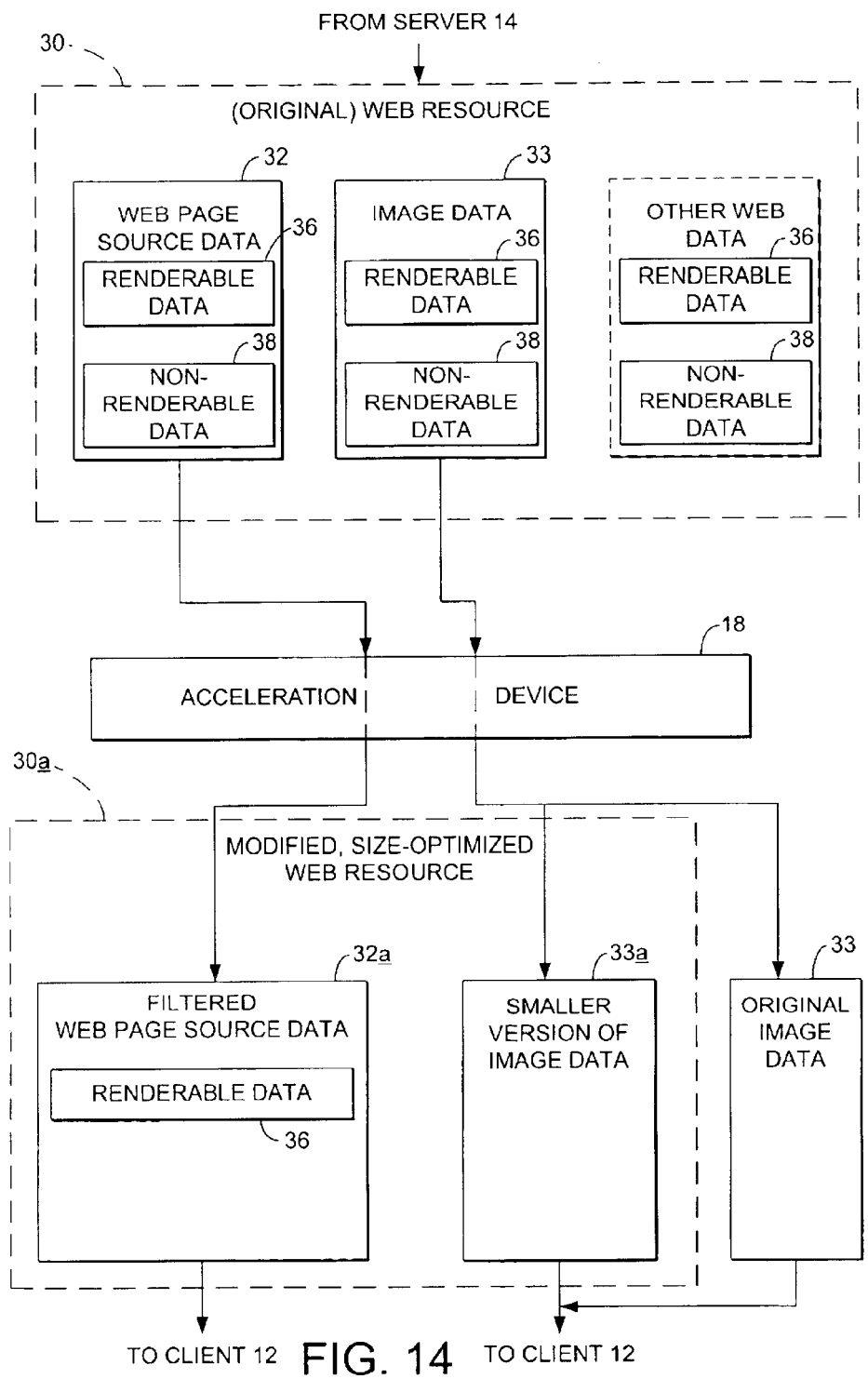
FIG. 14 is a schematic view of a data flow according to one embodiment of the present invention.

Servers 14, 28 typically are web servers 14, 28 configured to serve a web resource, shown at 30 in FIG. 14, to browser programs 34 executed on remote clients 12. Exemplary browser programs 34 include the Netscape browser commercially available from Netscape Communications Corporation of Santa Clara, California and the Internet Explorer browser commercially available from Microsoft Corporation of Redmond, Washington. The web servers and browsers typically communicate using the HyperText Transfer Protocol (HTTP). The web resource may be web page source data 32, image data 33, sound data, video data, graphics data, embedded code such as a JavaScript applet, a stylesheet, or virtually any other resource accessible and interpretable by a browser via a Uniform Resource Indicator (URI).

Figure 2:
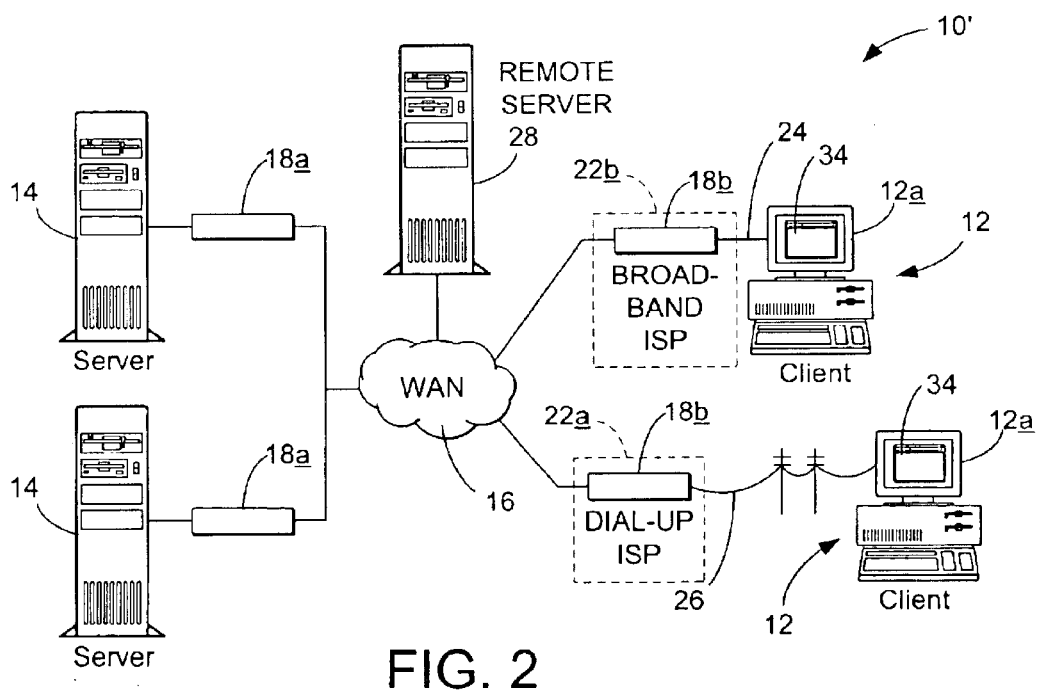
FIG. 2 is a schematic view of a network data acceleration system according to another embodiment of the present invention.

In FIG. 2, another embodiment of a computer networking system according to the present invention is shown at 10'. Computer networking system 10' typically includes server-side acceleration devices 18a positioned in the same location as described above for acceleration devices 18 of FIG. 1. Computer networking system 10' also typically includes remote client-side acceleration devices 18b positioned intermediate computer network 16 and a respective remote client 12. Typically, acceleration devices 18b are positioned at a dial-up ISP 22a, or at a broadband ISP 22b.

In the embodiment depicted in FIG. 2, acceleration devices 18a and 18b function in the manner described below, and also have the additional ability to communicate with each other using a binary protocol, thereby avoiding use of standard ASCII protocols such as HTTP, and decreasing the number of bits required for transmission of the web resource. In addition, acceleration devices 18a and 18b have the ability to establish an Internet Protocol (IP) level connection, and communicate in the binary protocol without using Transmission Control Protocol (TCP). TCP includes handshaking and other procedures that require valuable time and slow down the overall data transmission rate. Therefore, avoiding use of TCP effectively increases the rate at which data is transferred. Finally, the acceleration devices 18a and 18b have the ability to establish persistent connections with each other. Persistent connections are network connections on sockets that are always kept open once they are established. By keeping a connection open, the acceleration devices avoid repeating tasks associated with the opening and closing of sockets, thereby saving valuable time and increasing the overall data transmission rate.

Turning to FIG. 14, web resource 30 typically includes web page source data 32 and associated image data 33. Web resource 30 may also include other types of files such as video files, sound files, graphic animation files, embedded code files such as JavaScript applets, cascading stylesheets (CSS), etc. Web page source data 32 typically is encoded using a markup language such as the HyperText Markup Language (HTML), while image data 34 typically is encoded in a standard image format such as the JPEG, GIF, or animated GIF image formats. It will be appreciated that other suitable file formats may be used for the web page source data and the image data.

Web page source data 32 includes renderable data 36 and non-renderable data 38. Renderable data 36 is data that browser 34 is configured to interpret when rendering a web page 40 using web resource 30. That is, renderable data 36 is data that affects the manner in which browser 34 presents the visual and aural content and layout of web page 40, as well as the interactive functions of web page 40. Renderable data 36 includes, but is not limited to, text, images, layout and formatting instructions, background color, hyperlinks, graphic animations, sounds, etc.

Non-renderable data 38 is data that is not interpreted by browser 34 in a manner that affects the visual or aural content or layout of web page 40, nor the interactive function of web page 40. For example, whitespace, hard returns, comments, meta tags, keywords, etc. are examples of non-renderable data. Non-renderable data 38 also includes formatting instructions, such as HTML tags, which browser 34 on remote client 12 is not configured to interpret. Image data 33 may also contain non-renderable data such as author, title, comments, and creation date data.

As will be discussed in detail below, acceleration device 18 typically is configured to accelerate transmission of web resource 30 from server 14 to remote client 12 by processing web resource 30 to form a modified, size-optimized version of the web resource 30a. Size-optimized version 30a is smaller in file size than original web resource 30, and therefore takes less time to transfer via computer network 16.

Where web resource 30 includes web page source data 32, size-optimized version 30a of the original web resource 30 typically includes filtered web page source data 32a, produced by filtering at least a portion of non-renderable data 38 from original web page source data 32. Where web resource 30 includes image data 33, the size-optimized version 30a of the original data may include a smaller version of the image data 33a, produced by altering an image parameter of the image data and/or modifying the format of the image data, as described below.

Turning now to FIGS. 15 and 16, a web page rendered by browser 34 based on web resource 30 is shown at 40. Web page 40 typically includes remotely served content 42, served by remote server 28, as well as heading 44, inline image 46, and text 48. The text and formatting of web page 40 are determined by formatting instructions, also referred to as tags, and text data contained within web page source data 32. It will be understood that the ultimate visual and aural presentation of the web page 40 typically is not altered by filtering all or a portion of non-renderable data 38 from web page source data 32 by acceleration device 18.

Figure 17:
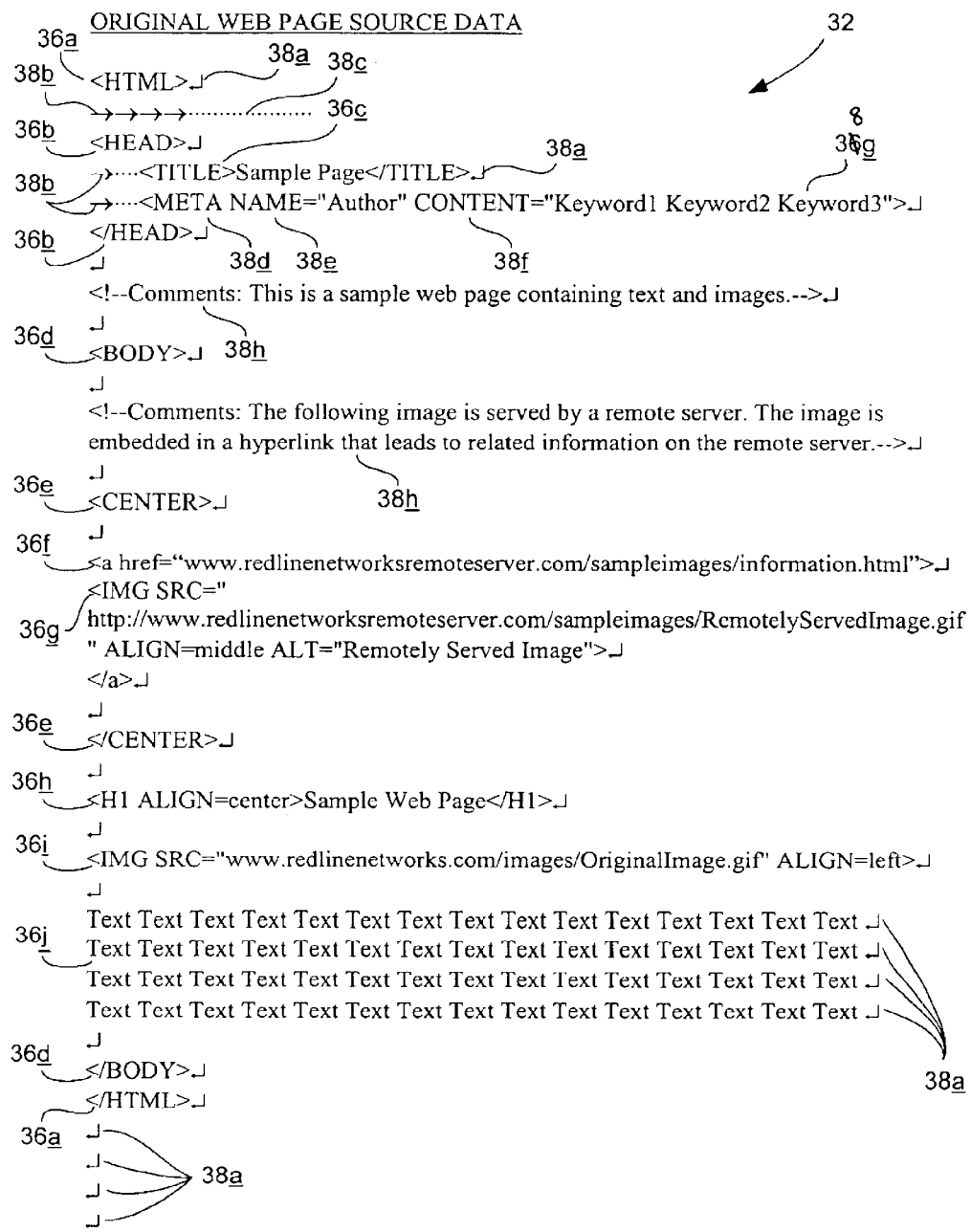
FIG. 17 is a listing of original web page source data.

Web page source data 32 contains a hyperlink, shown at 36g in FIG. 17, to remote server 28 for remotely served content 42. Hyperlink 36g typically includes a uniform resource locator (URL), and instructs browser 34 to request the image data for the remotely served content from remote server 28. Web page source data 32 also contains a hyperlink, shown at 36i in FIG. 17 and at 36k in FIG. 18, to inline image 46. Hyperlink 36i instructs browser 34 to request image data 33 corresponding to inline image 46 from web server 14.

As will be described below, according to one embodiment of the present invention, upon request by the browser for the image data, the acceleration device is configured to send a smaller version of the image data 33a, which is presented as size-optimized inline image 46a. After size-optimized inline image 46a is displayed, the web server typically instructs browser 34 to request an original, unmodified version of image data 33. The original version of image data 33 is ultimately displayed as original, unmodified inline image 46 via browser 34. Typically, the web server instructs the browser to download the original version of image data 33 by embedding a script (typically JavaScript) or other executable code in web page source data 32 for web page 40. This script is configured to rewrite the web page in the browser memory, such that the link 36k that was used to point to the smaller version of the image data 33a, is replaced with a link 36m that points to an original version of the image data 33.

To access web page 40, a user of remote client 12 typically establishes a connection to computer network 16 via ISP 22, and enters a Uniform Resource Locator (URL) of a desired web page 40 served by web server 14 into browser 34. Browser 34 typically sends a request to the web server 14 to serve the desired web page. Typically, acceleration device 18 is located at the IP address contained within the URL for the web server. Acceleration device 18 is configured to receive and process the request sent to web server 14, to accelerate the transmission of web resource 30 from web server 14 to remote client 12, as described below.

Figure 3:
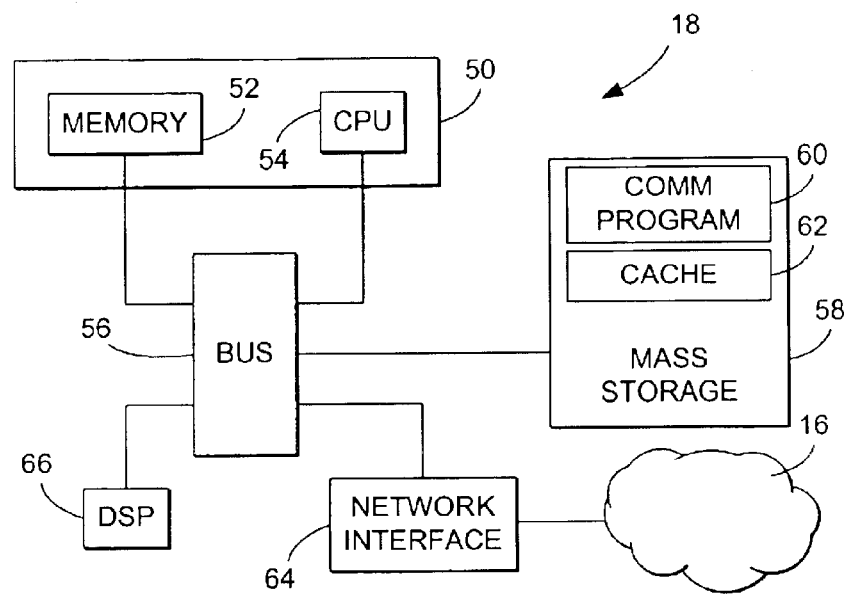
FIG. 3 is a schematic view of a network data acceleration device according to one embodiment of the present invention.

As shown in FIG. 3, acceleration device 18 includes a controller 50 having a memory 52 and central processing unit (CPU) 54 linked by a bus 56. Acceleration device 18 also typically includes a mass storage device 58 having a communications program 60 and cache 62. Communications program 60 is configured to process requests for web resource 30 from remote clients 12 according to the methods shown in FIGS. 6–13 and described below. Cache 62 is configured to store web resources 30, such as web page source data 32, filtered web page source data 32a and image data 33, 33a, previously requested by remote clients 12.

Acceleration device 18 also typically includes a network interface 64 coupled to bus 56 and to an external network connection to computer network 16. Network interface 64 is configured to enable acceleration device 18 to send and receive data via computer network 16. An example of a suitable network interface is the Intel Ethernet Pro 100 network card, commercially available from Intel Corporation of Hillsboro, Oreg. Acceleration device 18 also may include a digital signal processor (DSP) 66 configured to create a smaller version 33a of image data 33 in real-time, according to the methods described below in detail in FIGS. 10–12. Examples of commercially available DSPs suitable for use as DSP 66 are the Texas Instruments 501/6503 digital signal processors, commercially available from Texas Instruments, Inc., of Dallas, Tex.

Figure 4:
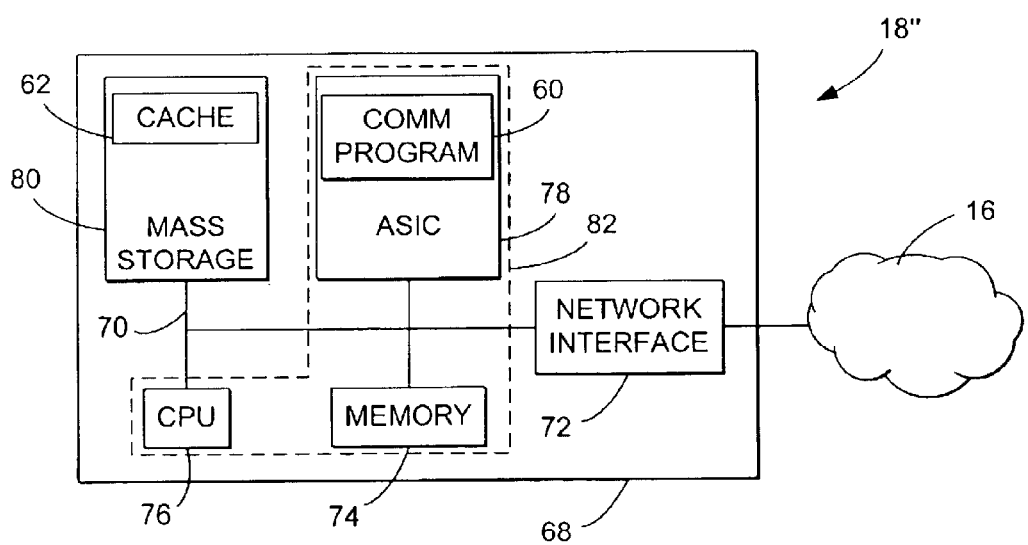
FIG. 4 is a schematic view of a network data acceleration device according to another embodiment of the present invention.
Figure 5:
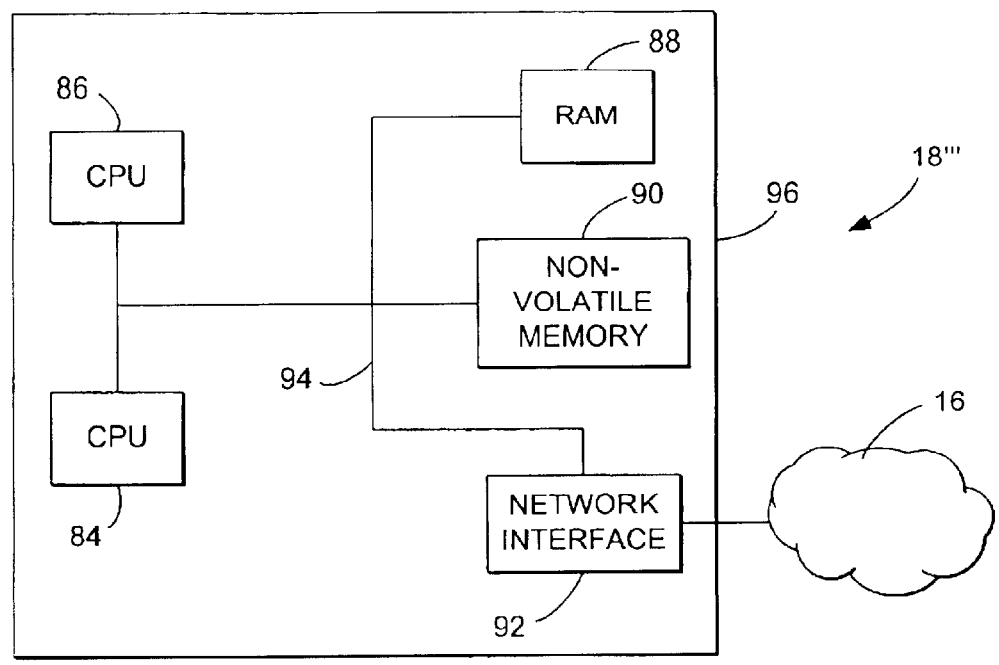
FIG. 5 is a schematic view of a network data acceleration device according to yet another embodiment of the present invention.

In FIG. 4, another embodiment of an acceleration device according to the present invention is shown generally at 18". Acceleration device 18" typically includes a single integrated circuit board 68. The integrated circuit board contains a bus 70 connecting a network interface 72, memory 74, CPU 76, Application Specific Integrated Circuit (ASIC) 78, and mass storage device 80. ASIC 78 typically contains the communication program 60, while mass storage device 80 typically contains the cache 62, described above. It will be appreciated that the embodiments of the acceleration device 18, 18" may be a stand-alone network appliance 18 or may be integrated with a web server 14', as shown at 18' in FIG. 1. ASIC 78, CPU 76, and memory 74 form a controller 82 configured to process requests for web resources according to the methods described below.

Figure 6:
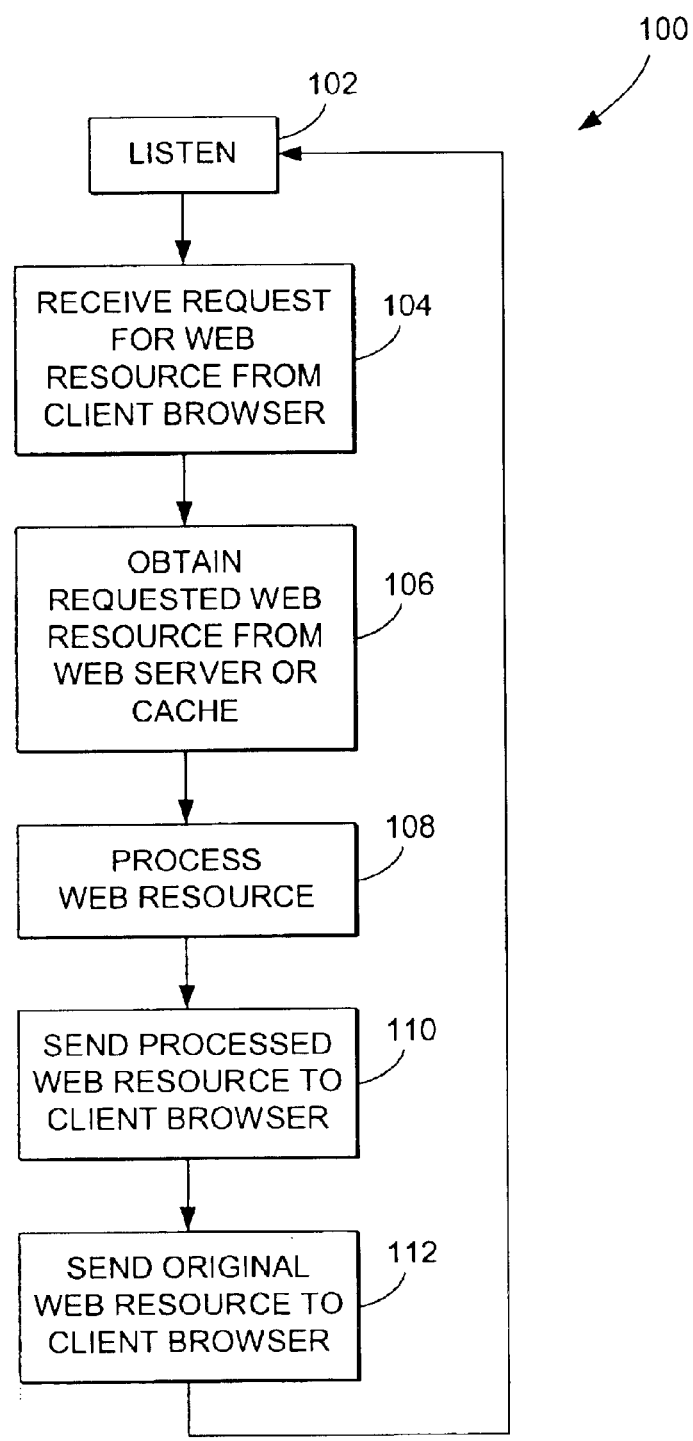
FIG. 6 is a flowchart of a method for computer networking according to one embodiment of the present invention.

In FIG. 6, yet another embodiment of an acceleration device according to the present invention is shown generally at 18'". Acceleration device 18'" typically includes a plurality of co-processing CPUs 84, 86 linked to each other and to RAM 88, non-volatile memory 90, and network interface 92 by a bus 94. Components 84–94 are typically mounted to a circuit board 96. Non-volatile memory is typically solid state memory such as flash memory or ROM, and contains communication program 60, described above. Ram 88 is available to CPUs 84, 86 for temporary storage of data when the CPUs are processing web requests according to the methods described below. Acceleration device 18'" typically does not include a mass storage device or cache, although alternatively a mass storage device and cache may be included. Components 84, 86, 88, and 90 form a controller configured to process requests for web resources according to the methods described below.

Turning now to FIG. 6, a method according to one embodiment of the present invention is shown generally at 100. Method 100 typically includes, at 102, listening at acceleration device 102 for a request for web resource 30. At 104, the method typically includes receiving a request for web resource 30 from remote client browser 12. Typically, the request is sent from remote client browser 12 to the IP address that the remote client browser associates with a web server 14, but which is actually assigned to an associated acceleration device 18. The request is typically received at acceleration device 18.

The method further includes at 106, obtaining original web resource corresponding to the requested web resource from web server 14. Typically, the original web resource is obtained by acceleration device 18. Alternatively, acceleration device 18 may determine that the requested web resource is cached, and may obtain the requested web resource from cache 62.

At 108, the method typically includes processing, at acceleration device 18, at least a portion of original web resource 30 to form size-optimized web resource 31a having a smaller file size than original web resource 30. Typically web resource 30 is processed based on its file type, according to the steps shown in FIGS. 7–8.

At 110, the method further includes, sending size-optimized web resource 31a to remote client 12. Typically size-optimized web resource 31a is sent from acceleration device 18 via computer network 16 to requesting remote client 12. The size-optimized web page is received by remote client 12 and is displayed on a display 12a associated with remote client 12.

At 112, the method further includes sending at least the portion of original web resource 30 that was size-optimized to the remote client in an original, unmodified state. Thus, method 100 may include sending from acceleration device 18 to remote client 12 all of original web resource 30 in an original unmodified state, or may include sending only a portion of original web resource 30 in an original unmodified state. According to one embodiment of the invention, web resource 30 may include web page source data 32 and image data 33, and the method at 112 may include sending only original image data 33 in an original, unmodified state.

Figure 7:
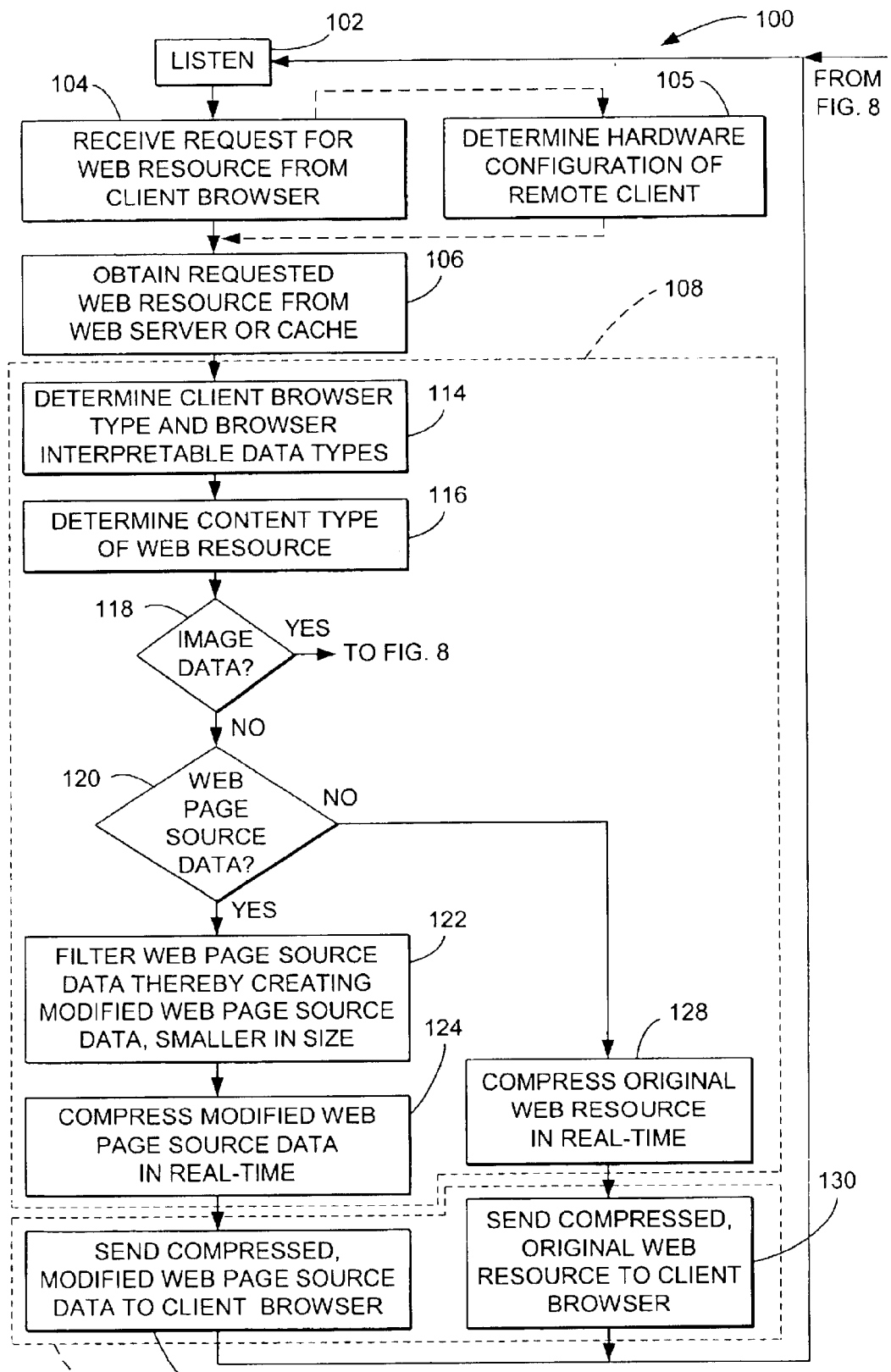
FIG. 7 is a flowchart of a method for computer networking according to another embodiment of the present invention.
Figure 8:
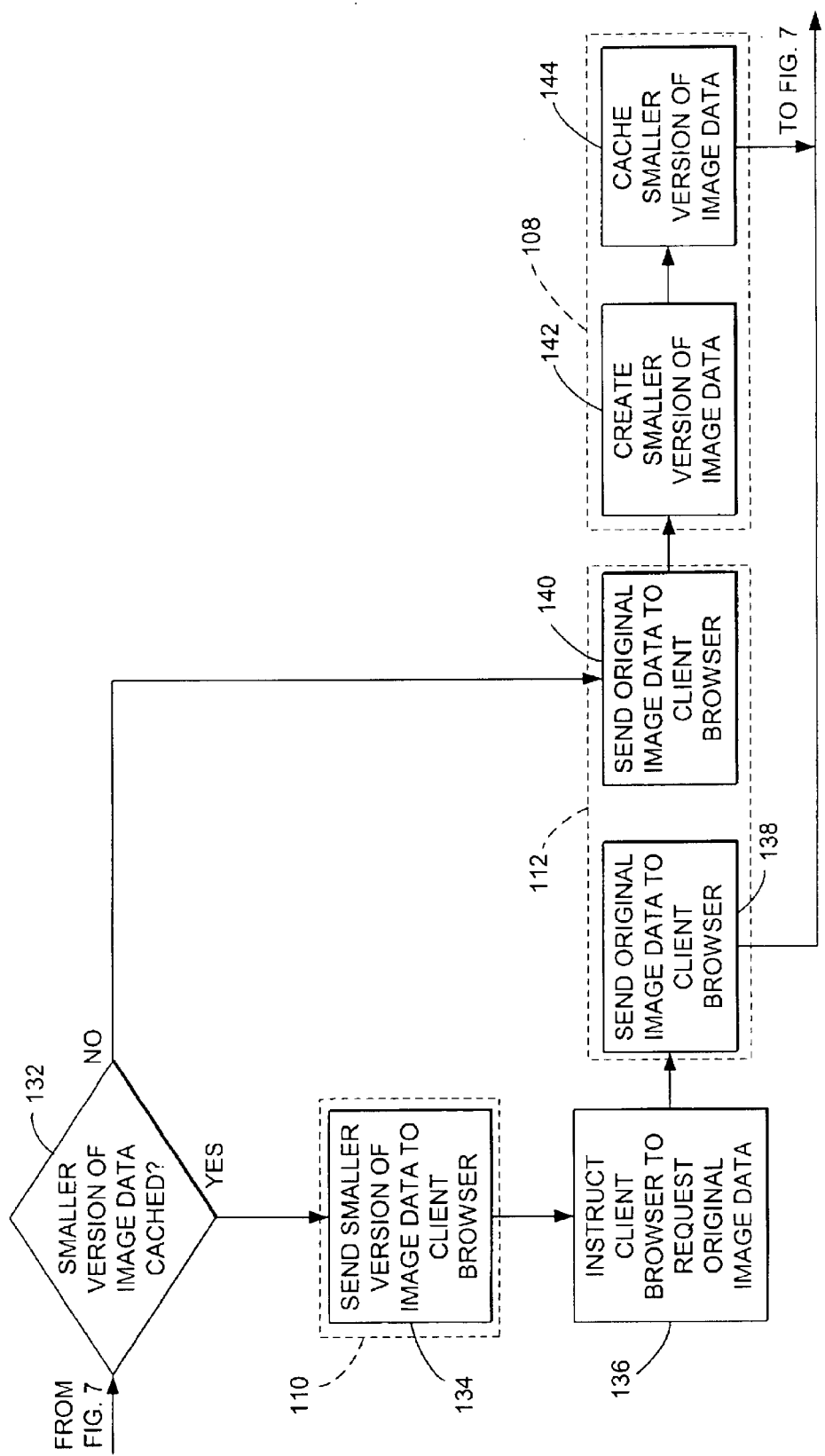
FIG. 8 is a continuation of the flowchart of FIG. 7.

Turning now to FIGS. 7 and 8, method 100 of FIG. 6 is shown in greater detail. Method 100 typically includes listening at 102, receiving a request for web resource 30 at 104, and obtaining requested web resource 30 at 106, as described above. At 105, the method includes determining a hardware configuration of the remote client. The hardware configuration is typically the number of colors supported by display 12a, as well as the resolution of display 12a. The hardware configuration is typically detected by sending an embedded file in web page source data, the file being configured to instruct the browser to send the hardware configuration to the web server in subsequent communications. The hardware configuration may be used to determine an optimum image data format for image data sent to remote client 12, as described below.

The step of processing web resource 30 is shown in detail at 108 in FIGS. 7–11. Processing web resource 108 typically includes, at 114, determining a remote client browser type and/or browser-interpretable file type. Typically, the remote client browser is either the Netscape browser, or the Internet Explorer browser, discussed above, or a browser compatible with one of these two browsers. Of course, it will be appreciated that other browser types may also be detected. The remote client browser type will be used to determine a compression algorithm for compressing data at steps 124 and 128. Browser-interpretable file types are typically sent in a request header from the remote client 12, and may include file types such as GZIP, DEFLATE, WAVELET compression and other file formats.

Processing web resource 108 also typically includes, at 116, determining a content type of web resource 30. Typically, the web resource is either web page source data 32, such as an HTML file, or image data 33. The method typically determines the content type of the web resource by examining the file extension, such as .html, .jpg, .gif, etc.

At 118, if the content type of web resource 30 shows that web resource 30 is image data 33, then method 100 proceeds to step 132 of FIG. 8. At 120, if the content type of web resource 30 shows that the web resource is web page source data 32, then method 100 proceeds to step 122.

At 122, processing 108 further includes filtering web page source data 32, thereby creating modified web page source data 32a, smaller in size than original web page source data 32. Modified web page source data 32a is also referred to herein as filtered web page source data 32a. Typically, the method includes filtering the web page source data 32 in real-time, after the request is received and before the filtered web page source data is sent to remote client 12.

Typically, filtering the web page source data is accomplished by filtering at least a portion of non-renderable data 38 from web page source data 32. In one embodiment of the invention, all of non-renderable data 38 is filtered from the web page source data 32. Alternatively, only a portion of the non-renderable data is filtered from As the web page source data.

Figure 9:
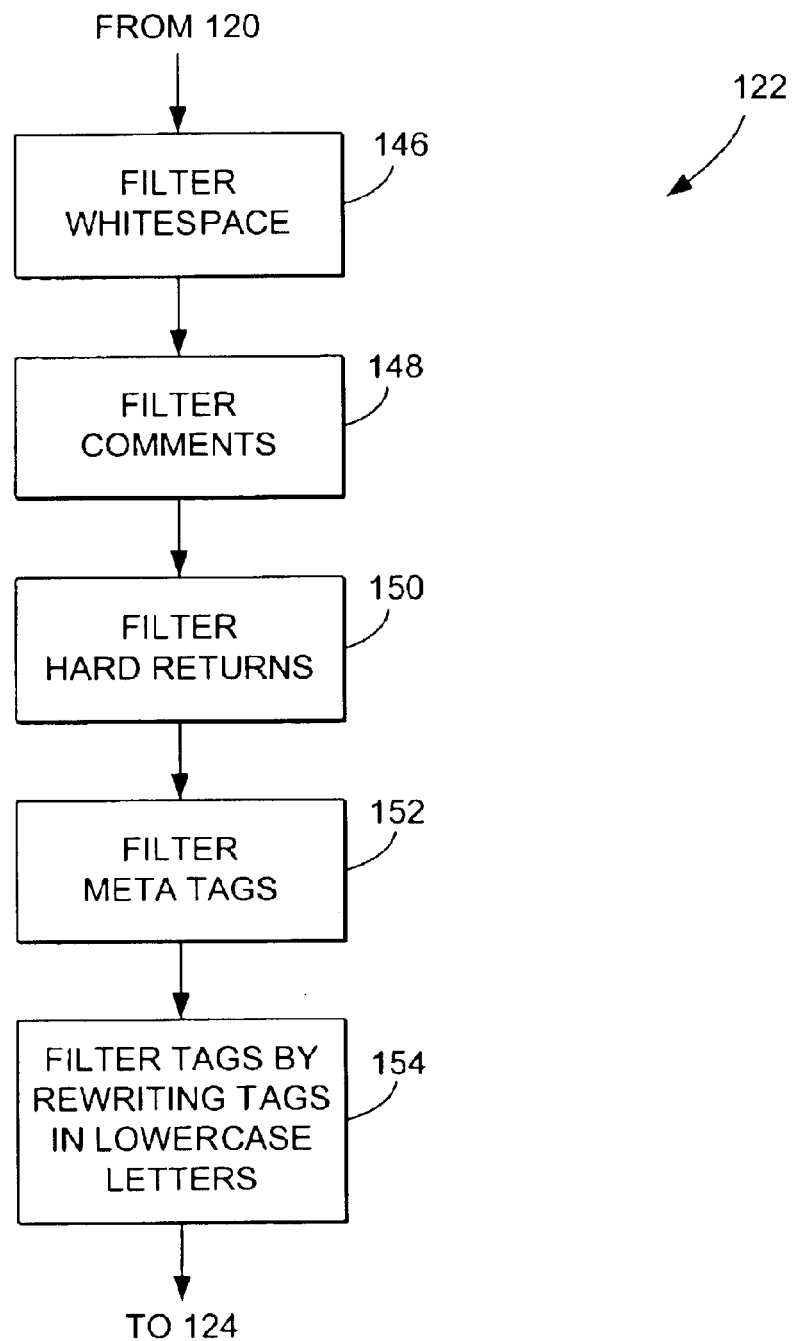
FIG. 9 is a flowchart of one embodiment of a method for accomplishing the step of filtering web page source data, shown in FIG. 7.

Typically, the non-renderable data is filtered according to a process shown in FIG. 9. At 146, the step of filtering 122 typically includes a substep of filtering whitespace from the web page source data. As used herein, the term whitespace refers to space, tab, and other characters in the web page source data 32 that will not be rendered in web page 40, shown at 38b and 38c in FIG. 17.

At 148, the step of filtering 122 typically includes a substep of filtering comments from the web page source data 32. Comments appear in web page source data 32 in the form shown at 38h in FIG. 17.

At 150, the step of filtering 122 typically includes a substep of filtering hard returns, shown at 38a in FIG. 17, out of web page source data 32. In HTML, a return or paragraph tag is used to instruct browser 34 to make a hard return in a file. However, in ASCII a return is accomplished either by a carriage return character (CR) and/or a line feed character (LF). Typically, CR and LF ASCII characters are not rendered by browser 34. Therefore, either or both of these characters may be filtered out of web page source data 32. In one embodiment of the invention, the method includes filtering out only the second of two consecutive CRLF character combinations. Thus, where CRLF CRLF appears in the web page source data 32, the second CRLF is filtered out and the first is left intact in the modified web page source data 32a. Due to formatting differences between browser types, the method may also include deleting hard returns in a manner based on browser type detected at step 114.

At 152, the step of filtering 122 typically includes a substep of filtering meta tags, shown at 38d in FIG. 17. Meta tags 38d are tags that contain keywords 38g used by Internet search engines to categorize and index web page 40. These meta tags 38d and the keywords 38g contained therein are not rendered by browser 34, and are thus typically filtered out of web page source data 32. Author and other data in meta tags 38d may also be filtered out.

At 154, the step of filtering 122 includes filtering tags by rewriting tags in lowercase letters. Rewriting the tags in lowercase letters tends to reduce the size of the image data after compression by a method such as GZIP or DEFLATE. Thus, rewriting tags in lowercase letters results in a filtered web page source data 32a with a smaller file size than original web page source data 32.

Additionally, filtering the web page source file at 122 may include filtering renderable data in a loss-less manner. For example, the method may include filtering a portion of the renderable data from the web page source data, and replacing the portion of the renderable data with substitute renderable data smaller in size and renderably equivalent to the replaced renderable data. Renderably equivalent data is data that is interpreted by browser 34 in a visually, aurally, and interactively identical manner. One example of substituting renderably equivalent data is substituting a set of formatting instructions with an equivalent stylesheet. Thus, the present may include substituting a stylesheet for a set of formatting instructions in web page source data 32.

Returning to FIG. 7, once filtered web page source data 32a is produced, method 100 returns to step 124, at which point filtered web page source data 32a is compressed in real-time at the acceleration device. If the detected browser type from step 114 is Internet Explorer, filtered web page source data 32a is typically compressed using the GZIP compression algorithm. If the detected browser type from step 114 is Netscape, the filtered web page source data 32a is typically compressed using the DEFLATE compression algorithm. Alternatively, the method may include detecting whether GZIP, DELFATE, or other compression algorithm is a browser-interpretable file type at 114.

At 126, the method further includes sending the compressed, filtered web page source data 32a from acceleration device 18 to remote client 12 for display via browser 34. The method may also include, either automatically or in response to a request from the user, sending the original web page source data 32 to the remote client browser after sending compressed, filtered web page source data 32a to the browser.

If at 120, it is determined that web resource 30 is not web page source data 32, then method 100 typically includes compressing web resource 30 in an original, unmodified state, in real-time, using a compression algorithm selected based on browser type or browser-interpretable file format, as described above. At 130, the method further includes sending compressed, original web resource 30 to remote client 12 via computer network 16.

If at 118 it is determined that web resource 30 is image data 33, then method 100 typically includes, at 132, determining whether a smaller version of image data 33a is cached on cache 62. If a smaller version of the image data 33a is already stored on cache 62, the method includes retrieving the smaller version 33a from cache 62 and, at 134, sending smaller version 33a of the image data to remote client 12 for display via browser 34 as smaller image 46a on web page 40. Step 134 is one exemplary way of accomplishing step 110 of FIG. 6.

At 136, the method typically includes instructing browser 34 to request original image data 33. Typically, this is accomplished by rewriting or replacing a hyperlink in web page source data 32. The hyperlink is shown before rewriting at 36k in FIG. 18, and after rewriting at 36m in FIG. 19. Before rewriting, hyperlink 36k points to the smaller version 33a of the image data, and, after rewriting, hyperlink 36m points to original image data 33. Rewriting the hyperlink prompts browser 34 to request the original version of image data 33.

In response to this request, the method includes, at 138, sending an original, unmodified version of image data 33 to remote client 12. Browser 34 on remote client 12 displays the original image data as original, unmodified image 46 on web page 40a. Step 138, and step 140 described below, are two illustrative ways of accomplishing step 112 in FIG. 6. From step 138, the method typically returns to listening for new requests for web resources at step 102 in FIG. 7.

If at step 132, it is determined that a smaller version 33a of the image data is not cached, then method 100 typically includes, at 140, sending original image data 33 to browser 34 on remote client 12. Browser 34 displays original image data 33 as image 46 on the web page. Thus, the first time that acceleration device 18 encounters a request for a particular image data 33, the image is typically sent to the requesting remote client without first sending a smaller version 33a of the image data. This is because, according to one preferred embodiment of the invention, image processing is not performed in real-time, in order to decrease latency in serving the requested image data to remote client 12.

Alternatively, according to another preferred embodiment of the invention, image data 33 may be processed in real-time by DSP 66 of acceleration device 18. According to this embodiment of the invention, a smaller version 33a of the image data is created in real-time and sent to remote client 12, followed shortly thereafter by the original image data 33.

After the original image is sent at 140, the method further includes, at 142, creating a smaller version 33a of original image data 33 and, at 144, caching the smaller version 33a on cache 62. After caching the smaller version 33a, the method subsequently returns to listening for new requests for web resource at 102 in FIG. 7.

Figure 10:
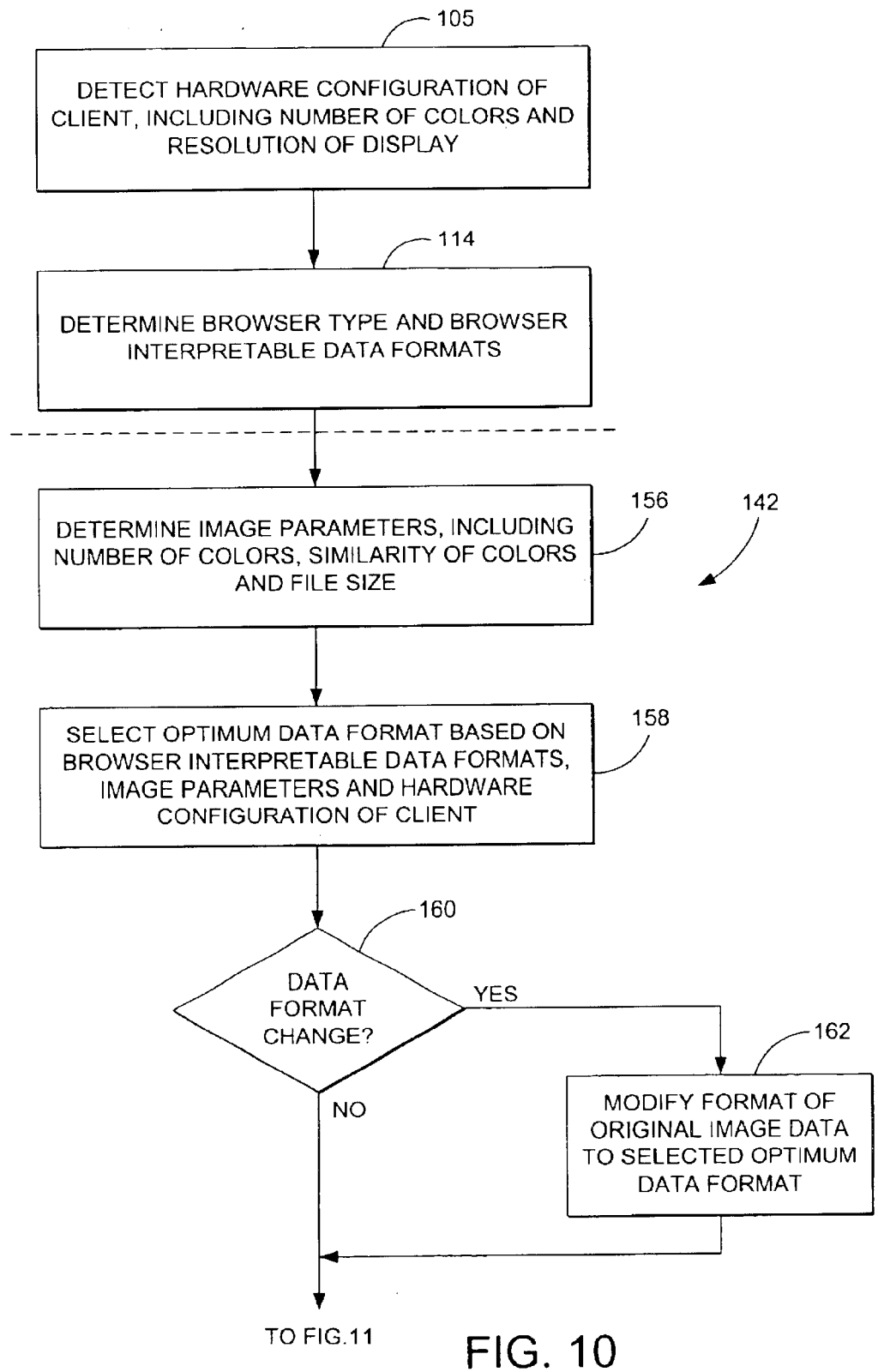
FIG. 10 is a flowchart of one embodiment of a method for accomplishing the step of creating a smaller version of the image data, shown in FIG. 8.

As shown in FIG. 10, the step of creating the smaller version 33a of the image data is typically accomplished by, at 156, determining one or more image parameters. The image parameters may include number of colors, similarity of colors, file size, resolution, or other image parameters. At 158, the method typically includes selecting an optimum data format for the image data based on browser interpretable data format(s) determined at 114, a hardware configuration of remote client 12, determined at 105, and the image parameter(s) determined at 156. For example, if the user's display 12a is configured to display only 256 colors, and the original image data 33 includes millions of colors, the present method is configured to convert the file format of the image data to a 256 color file format and send the 256 color image to the remote client as smaller version 33a. By way of this example, it will be understood that the smaller version 33a of the image file may be generated by means of loss-less compression. That is, smaller image 46a may appear identical to original image 46 to the user of remote client 12, because the user's hardware configuration is not configured to fully display the colors or resolution of the original image 46.

At 160, the method further includes determining if the image data is already stored in the optimum file format. If so, the method proceeds to FIG. 11. If not, the method further includes, at 162, modifying the format of the original image data to he optimum data format. Thus, acceleration device 18 is configured to receive image data in one format such as JPEG, for example, and convert the image data into another optimum format, such as GIF, before sending the image to the requesting remote client 12. This conversion may be performed in real time by a DSP, or may be performed "off line" by caching an image file in the optimum format for future requests and sending the image file in an unmodified format to the current requesting remote client 12.

Figure 11:
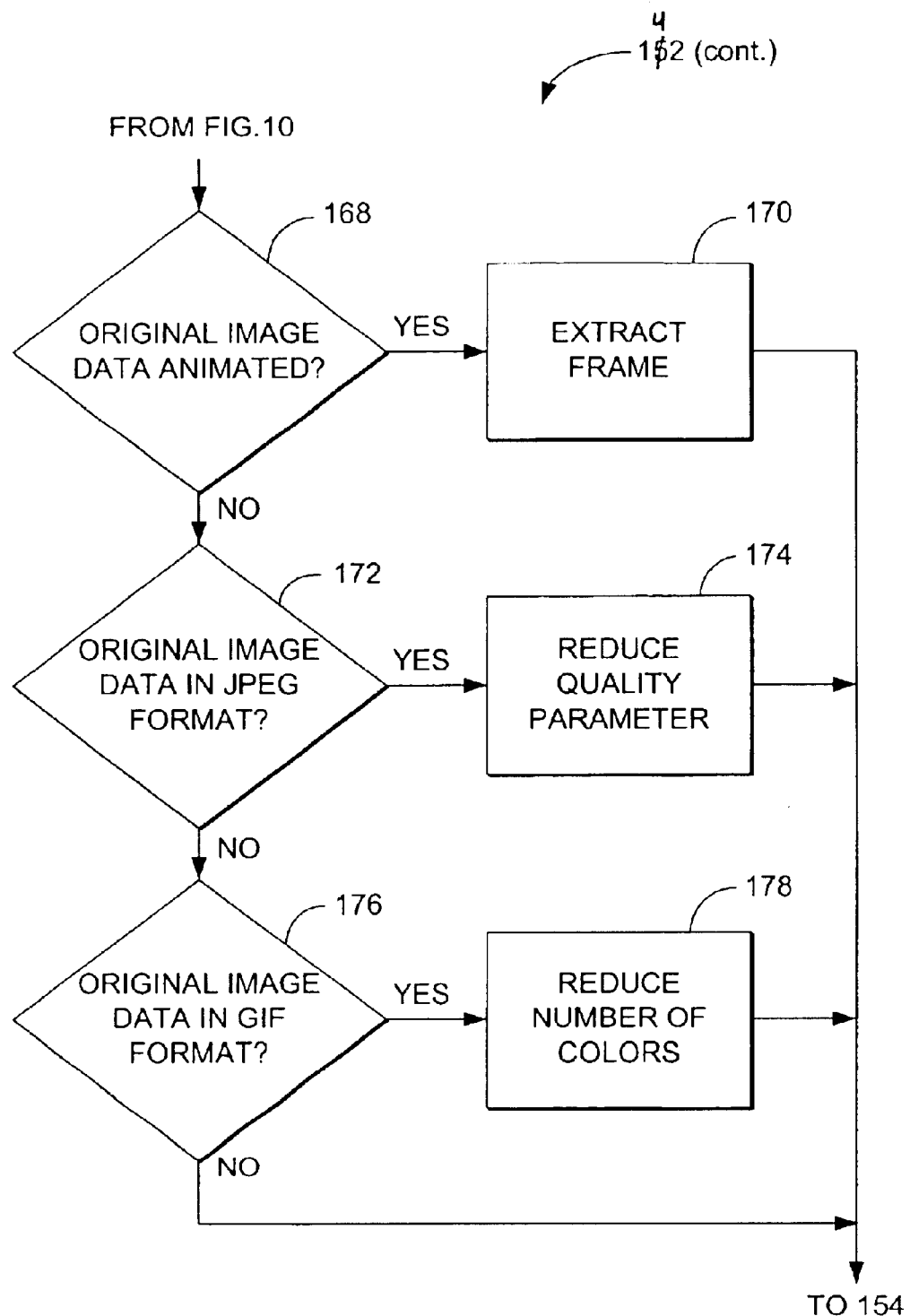
FIG. 11 is a continuation of the flowchart of FIG. 10.

As shown in FIG. 11, step 142 of creating the smaller version 33a of the image data is typically further accomplished by, at 168, determining whether original image data 33 is animated (such as an animated GIF file), and if so, extracting a frame of the image data at 170. Typically, the first frame is extracted, although virtually any suitable frame may be extracted. The first frame is then cached as smaller version 33a of the image data. The first frame may further be reduced in size by reducing the number of colors or reducing a quality parameter associated with the first frame, as described below.

At 172, the method further includes determining whether original image data 33 is in a JPEG format. If so, the method further includes, at 174, reducing a quality parameter associated with JPEG image data 33. This reduces the overall file size of JPEG image data 33. The resultant image data is cached as smaller version 33a of image data 33.

At 176, the method further includes determining whether original image data 33 is in a GIF format. If so, the method further includes, at 178, reducing the number of colors in the GIF image data. This reduces the overall file size of GIF image data 33. The resultant image data is cached as smaller version 33a of image data 33.

Figure 12:
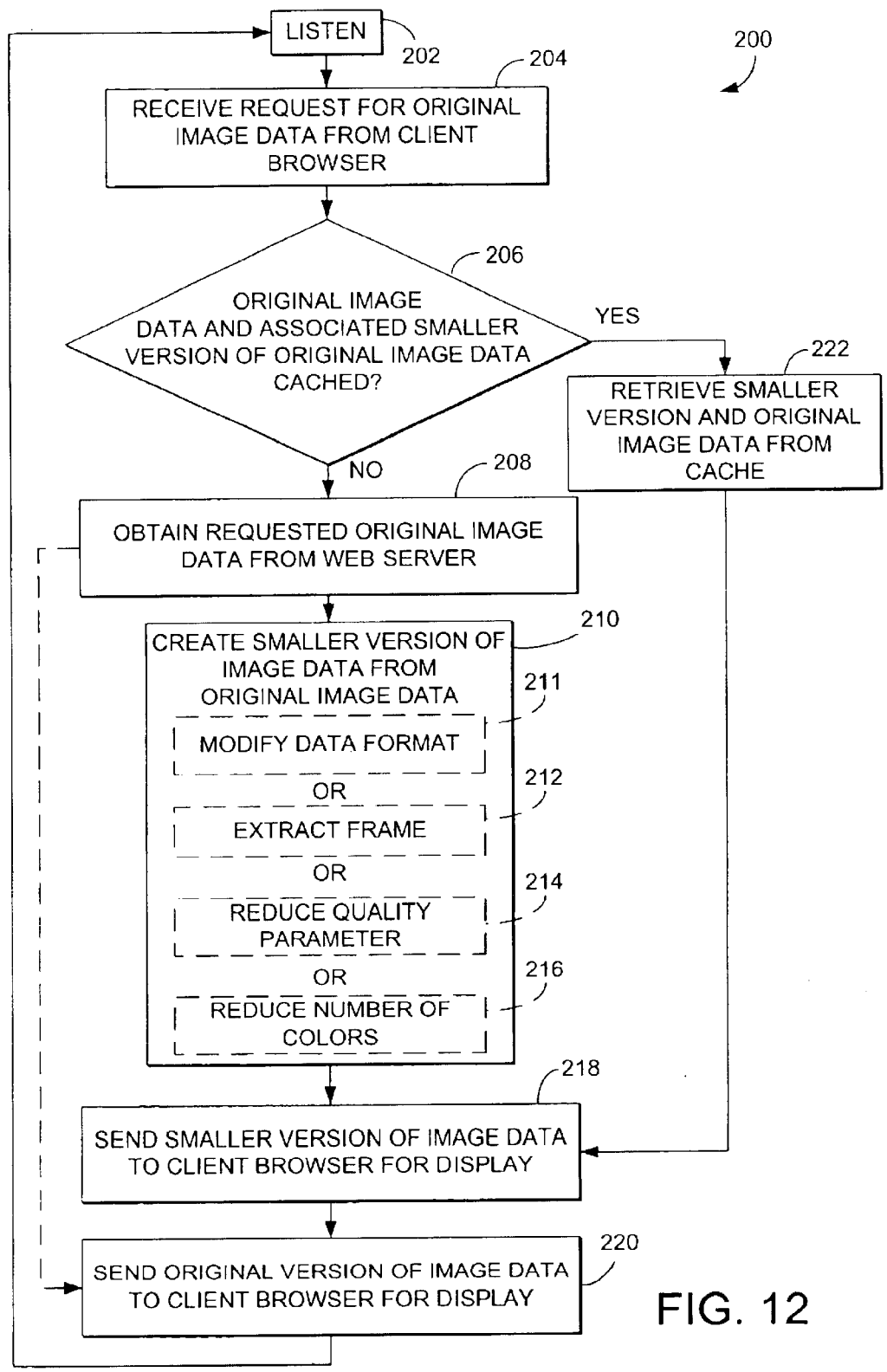
FIG. 12 is a flowchart of a method for transferring image data over a computer network, according to one embodiment of the present invention.

Turning now to FIG. 12, a method for transmitting image data according to another embodiment of the present invention is shown generally at 200. Method 200 typically includes, at 202, listening for a request from a remote client 12 for web resource 30. Listening at 202, as well as all other steps in methods 200, is typically performed by acceleration device 18, described above. At 204, the method typically includes receiving a request for original image data 33 from a browser 34 on remote client 12.

At 206, the method typically includes, determining whether original image data 33 and an associated smaller version 33a are cached on cache 62. If not, the method proceeds to 208, where the method includes obtaining requested original image data 33 from web server 14.

At 210, the method further includes creating a smaller version 33a of image data 33. Typically, this is accomplished by, at 211, modifying the image data to an optimum format, at 212, extracting a frame of animated image data, at 214, reducing a quality parameter associated with image data, and/or at 216, or reducing the number of colors associated with the image data. These steps are described in detail above.

At 218, the method typically includes, sending smaller version 33a of image data 33 to browser 34 of remote client 12 for display as smaller image 46a on a web page 40. The method may also include instructing browser 34 to request original version of image data 33, typically by rewriting a hyperlink, as described above. At 220, the method typically includes sending original version of image data 33 to browser 34 for display as original image 46 in web page 40a.

Alternatively, method 200 may proceed directly from obtaining the original image from web server 14 at 208, to sending the original image to remote client 12 at 220, thereby reducing latent processing time at acceleration device 18. In this embodiment, the method typically includes creating a smaller version 33a according to step 218 and caching the smaller version 33a on cache 62 after an original image 33 is sent to remote client 12 at 220. The method subsequently returns to listening at 202.

If, at 206, it is determined that original image 33 and associated smaller version 33a of the image previously created according to step 210, is cached, then the method typically further includes retrieving the original and smaller versions 33, 33a from the cache at step 222, and sending the original and smaller versions 33, 33a to the remote client 12 at steps 218, 220. The method subsequently returns to listening at 202.

Figure 13:
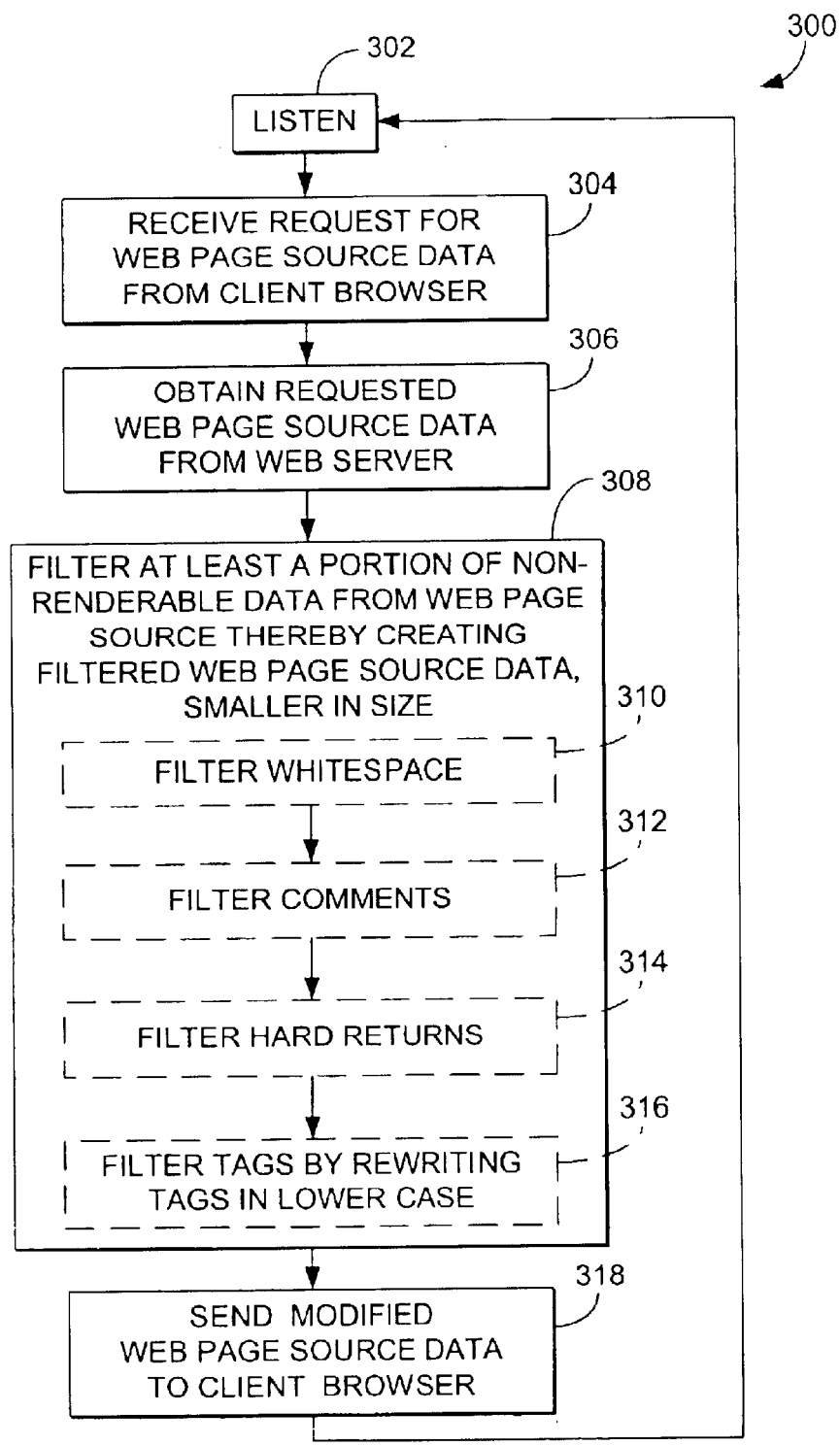
FIG. 13 is a flowchart of a method for transferring web page source data over a computer network, according to one embodiment of the present invention.

Turning now to FIG. 13, a method for transmitting web page source data according to another embodiment of the invention is shown generally at 300. Method 300 typically includes, at 302, listening for a request for web page source data 32 from a remote client 12. The step of listening, as well as all other steps of method 300, are typically performed by acceleration device 18, described above.

At 304, the method typically includes receiving a request for web page source data 32, such as an HTML file, from a browser 34 on remote client 12. At 306, the method further includes obtaining requested web page source data 32 from an associated web server 14. The web page source data may also be obtained from cache 62 if it is static web page source data stored thereon.

Typically, web page source data 32 includes renderable data 36 and non-renderable data 38, as described above. At 308, the method typically includes filtering at least a portion of non-renderable data 38 from the web page source data, thereby creating a modified and filtered version 32a of the original web page source data. Modified web page source data 32a is smaller in file size than original web page source data 32.

Typically, filtering at 308 is accomplished by one or more of filtering substeps 310–316. At 310, the method may include filtering whitespace from web page source data 32, as described above. At 312, the method may include filtering comments from the web page source data, as described above. At 314, the method may include filtering hard returns from the web page source data, as described above. At 316, the method may include filtering tags from the web page source data by rewriting the tags in lowercase, as described above. In addition, the method may include filtering non-renderable commands such as HTML tags that browser 34 cannot interpret.

At 318, the method typically includes sending modified and filtered web page source data 32a to browser 34 on remote client 12. The method may also include, before sending the modified web page source data 32a, compressing modified web page source data 32a. The compression algorithm used to compress the modified web page source data may be selected based on a detected browser type and/or browser-interpretable data format, as described above.

Browser 34 is configured to display modified web page source data 32a as web page 40. The visual and aural presentation of modified web page source data 32a via browser 34 is typically identical to the visual and aural presentation of original web page source data 32 via browser 34. That is, the two files 32, 32a look, sound, and interact in the same manner for a user of browser 34.

Turning now to FIG. 17, an example of original web page source data is shown generally at 32. Typically, web page source data 32 is in the HTML format, and may be a static file or may be dynamically generated. Web page source data 32 typically includes renderable data 36 and non-renderable data 38, as described above. Renderable data 36 typically includes HTML tags relating to language and formatting, such as HTML tag 36a, HEAD tag 36b, TITLE tag 36c, BODY tag 36d, CENTER tag 36e, anchor (A) tag 36f, image (IMG) tags 36g, 36i, and heading (H1) tag 36h. Renderable data 36 also includes text data 36i, and linked image data. Image tag 36i is a hyperlink to an original version of the image data 33.

Non-renderable data 38 typically includes hard returns 38a and whitespace such as tabs 38b and spaces 38c. Non-renderable data further includes meta tags 36d, which contain parameters such as the author parameter 36e, and the content parameter 36f. The content parameter 36f typically contains keywords 36g, which are used by search engines to catalog and index the web page. Non-renderable data 36 further includes comments 36h. Any and/or all of non-renderable data 36 may be filtered out of web page source data 32 according to the embodiments of the present invention.

FIG. 18 shows filtered web page source data 32a, with a hyperlink 36k to smaller version 33a of image data 33. Whitespace, hard returns, meta tags (including author, and content-related keywords) and comments have been removed. Browser 34 interprets web page source data 32a to display web page 40 (having smaller image 46a) on remote client 12. Because web page source data 32a has the non-renderable data filtered from it, and because it contains a hyperlink to a smaller image file 33a, it requires less time to download than web page source data 32. Thus, the user may view web page 40 more quickly using the herein described data transmission methods than using conventional methods.

FIG. 19 shows filtered web page source data 32a', with a hyperlink 36m to original image data 33. Typically, embedded code (typically an applet) is inserted into the web page source data 32 to cause the browser 34 to rewrite the filtered web page source data 32a to the form shown at 32a', as described above. Browser 34 interprets web page source data 32a' to display web page 40a on remote client 12. Thus, while having the benefit of being able to download web page 40 quickly, the user is eventually able to view an original version 46 of image data 33.

The above described invention may be used to accelerate data transmission over a computer network, in order to decrease delay and provide users with a more pleasurable experience.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. A method for computer networking, comprising:
receiving a user-initiated request for a web resource from a remote client, the web resource containing renderable data and non-renderable data, the request being received at a networking device positioned intermediate the remote client and a web server on a computer network;
obtaining an original web resource corresponding to the requested web resource;
processing at least a portion of the original web resource to form a size-optimized web resource having a smaller file size than the original web resource, wherein the size-optimized web resource is generated in real time, by removing at least a portion of the non-renderable data from the web resource after it is received by the networking device and before the web resource is sent to the remote client, wherein the size-optimized web resource is not retrieved from a cache;
sending the size-optimized web resource to the remote client; and
sending at least the portion of the original web resource that was size-optimized to the remote client in an original, unmodified state, without requiring the user to input a command to send a second request for the original web resource.

2. The method of claim 1, wherein the web resource is image data.

3. The method of claim 2, further comprising, determining an optimum image data format for the image data.

4. The method of claim 3, further comprising determining a browser-interpretable file format and selecting the optimum image data format based at least in part on the browser interpretable file format.

5. The method of claim 3, further comprising determining an image parameter and selecting the optimum image data format based at least in part on the image parameter.

6. The method of claim 5, wherein the image parameter is selected from the group consisting of number of colors, similarity of colors, and file size.

7. The method of claim 3, further comprising modifying the original image data format to the optimum data format.

8. The method of claim 2, wherein processing at least the portion of the original web resource includes creating a smaller version of the image data.

9. The method of claim 8, wherein creating a smaller version of the image data includes reducing the quality parameter in image data in JPEG format.

10. The method of claim 8, wherein creating a smaller version of the image data includes reducing the number of colors in image data in GIF format.

11. The method of claim 8, wherein the image data is animated.

12. The method of claim 11, wherein creating a smaller version of the animated image data includes extracting a frame of the animated image data.

13. The method of claim 12, wherein the extracted frame is in GIF format, and creating a smaller version includes reducing the number of colors of the first frame.

14. The method of claim 1, further comprising instructing the remote client to request the original, unmodified web resource.

15. The method of claim 14, wherein instructing the remote client to request the original, unmodified web resource is accomplished by rewriting web page source data to include a hyperlink to the original, unmodified web resource.

16. The method of claim 1, wherein the web resource is web page source data.

17. The method of claim 16, wherein processing at least a portion of the original web resource includes filtering web page source data thereby creating modified web page source data, smaller in size.

18. The method of claim 17, wherein filtering includes filtering at least a portion of the non-renderable data from the web page source data.

19. The method of claim 18, where in the non-renderable data is selected from the group consisting of whitespace, comments, hard returns, keywords, meta tags and commands not interpretable by the remote client.

20. The method of claim 19, wherein filtering the web page source data includes filtering tags by rewriting tags in lowercase letters.

21. The method of claim 1, wherein receiving a request for a web resource from a remote client includes receiving a request from a remote client browser via a computer network.

22. The method of claim 21, wherein the computer network is a WAN.

23. The method of claim 22, wherein WAN is the Internet.

24. The method of claim 23, wherein obtaining original web resource corresponding to the requested web resource includes requesting and receiving the original web resource from a web server.

25. The method of claim 24, wherein original web resource is received from the web server via a LAN.

26. The method of claim 1, wherein processing at least the portion of the original web resource includes compressing the web resource in real-time.

27. The method of claim 26, further comprising, detecting a browser-interpretable data format and selecting a compression algorithm based on the detected browser-interpretable data format.

28. The method of claim 26, where compressing the web resource includes compressing using the GZIP compression algorithm.

29. The method of claim 26, where compressing the web resource includes compressing using the DEFLATE compression algorithm.

30. A method for use in computer networking, the method comprising:

receiving a user-initiated request for a web resource from a remote client, the web resource containing renderable and non-renderable data, the request being received at a networking device positioned intermediate a remote client and a server on a computer network;

at the networking device, filtering at least a portion of the non-renderable data from the requested web resource, thereby creating a modified web resource; and sending the modified web resource to the remote client;

sending an original, unfiltered version of the requested web resource to the remote client, without requiring the user to input a command to send a second request for the original web resource;

wherein, the modified web resource is generated in real time at the networking device, and is not retrieved from a cache.

31. The method of claim 30, wherein the remote client includes a browser and the non-renderable data is not renderable by the browser.

32. The method of claim 30, wherein the web resource is web page source data.

33. The method of claim 30, wherein the web resource is image data.

34. The method of claim 32, wherein the filtered portion of the non-renderable data includes whitespace.

35. The method of claim 32, wherein the filtered portion of the non-renderable data includes comments.

36. The method of claim 32, wherein the filtered portion of the non-renderable data includes hard returns.

37. The method of claim 32, wherein the filtered portion of the non-renderable data includes meta tags.

38. The method of claim 32, wherein the filtered portion of the non-renderable data includes keywords configured to be interpreted by a search engine.

39. The method of claim 32, wherein filtering further includes filtering tags of the web page source data by rewriting the tags in lowercase.

40. The method of claim 32, wherein filtering includes filtering renderable data that the remote client is not configured to interpret.

41. The method of claim 40, further comprising detecting a browser type of a browser executed on the remote client, determining an HTML tag that the browser is not configured to interpret, and filtering the non-interpretable HTML tag.

42. The method of claim 32, further comprising, filtering a portion of the renderable data from the web page source data, and replacing the portion of the renderable data with substitute renderable data smaller in size and renderably equivalent to the replaced renderable data.

43. The method of claim 32, wherein the substitute renderable data includes a stylesheet.

44. The method of claim 30, wherein the original, unfiltered version of the requested web resource is sent to the remote client in response to a subsequent request from the remote client for the original, unfiltered version, the subsequent request being generated at the remote client without requiring a user command to send the request.

45. The method of claim 30, further comprising, compressing the modified web resource before sending it to the remote client.

46. The method of claim 45, wherein the modified web resource is compressed using loss-less compression.

47. A method for use in computer networking, the method comprising:

receiving a request for a web resource from a remote client, the request being received at a networking device positioned intermediate the remote client and a server on a computer network;

at the networking device, in real-time, creating a modified web resource based on the requested web resource, the modified web resource being smaller in size than the requested web resource; and sending the modified web resource to the remote client;

sending an original, unfiltered version of the requested web resource to the remote client, without requiring the user to input a command to send a second request for the original web resource;

wherein the modified web resource is generated in real time at the networking device, and is not retrieved from a cache.

48. The method of claim 47, wherein the networking device is linked to an associated web server via a LAN, the method further comprising, before creating the modified web resource, transferring the web resource from the web server to the networking device.

49. The method of claim 47, wherein the web resource is web page source data.

50. The method of claim 47, wherein the web resource is image data.

51. The method of claim 47, wherein the original, unmodified version of the requested web page resource is sent to the remote client in response to a subsequent request from the remote client for the original, unmodified version, the subsequent request being generated at the remote client without requiring a user command to send the request.

52. A networking device for use on a computer network having a web server and a remote client, wherein the remote client is configured to download a web resource from the web server via the computer network, the device comprising, a controller configured to:

receive a user-initiated request for the web resource from the remote clients, the web resource containing renderable data and non-renderable data;

in response, obtain the requested web resource from the web server; and process at least a portion of the original web resource to form a size-optimized web resource having a smaller file size than the original web resource, wherein the size-optimized web resource is generated in real time by filtering at least a portion of the non-renderable data from the web resource, and is not retrieved from a cache;

send the size-optimized web resource to the remote client;

send at least the portion of the original web resource that was size-optimized to the remote client in an original, unmodified state, without requiring the user to input a command to send a second request for the original web resource.

53. The networking device of claim 52, wherein the controller includes a network communications program logic stored on an ASIC.

54. The networking device of claim 52, wherein the controller includes a CPU coupled to a memory, and a network communications program stored in memory and executable by the CPU.

55. The networking device of claim 52, wherein the requested web resource includes web page source data containing non-renderable data, and the controller is configured to filter out at least a portion of the non-renderable data from the web page source data, thereby accelerating the transmission of the web page source data to the remote client via the computer network.

56. The networking device of claim 55, wherein the requested web resource includes image data, and wherein the size-optimized web resource includes a smaller version of the image data.

57. A system for use in computer networking, the system comprising:

a computer network;

a web server;

a remote client configured to request an original web resource from the web server via the computer network; and an acceleration device positioned intermediate the web server and the remote client on the computer network, the acceleration device being configured to:

receive a user-initiated request for the original web resource from the remote client, the original web resource containing renderable data and non-renderable data;

in response, obtain the requested original web resource from the web server;

process at least a portion of the original web resource to form a size-optimized web resource having a smaller file size than the original web resource, wherein the size-optimized web resource is generated in real time, and not retrieved from a cache;

send the size-optimized web resource to the remote client; and send at least the portion of the original web resource that was size-optimized to the remote client in an original, unmodified state, without requiring the user to input a command to send a second request for the original web resource.

58. The system of claim 57, wherein the web server and the acceleration device are connected via a LAN.

59. The system of claim 57, wherein the computer network is a WAN.

60. The system of claim 58, wherein WAN is the Internet.

61. The system of claim 57, wherein the remote client includes a web browser configured to send the request to download the web resource from the web server.

62. The system of claim 57, wherein at least a portion of the original web resource is image data.

63. The system of claim 62, wherein the acceleration device is further configured to determine an optimum image data format for the image data.

64. The system of claim 63, wherein the acceleration device is further configured to determine a browser-interpretable file format and select the optimum image data format based at least in part on the browser interpretable file format.

65. The system of claim 63, wherein the acceleration device is further configured to determine an image parameter and select the optimum image data format based at least in part on the image parameter.

66. The system of claim 65, wherein the image parameter is selected from the group consisting of number of colors, similarity of colors, and file size of the image data.

67. The system of claim 63, wherein the acceleration device is further configured to modify the original image data format to the optimum data format.

68. The system of claim 62, wherein the acceleration device is further configured to form the size-optimized web resource by creating a smaller version of the image data.

69. The system of claim 68, wherein the image data is a JPEG file and the acceleration device is configured to reduce a quality parameter of the JPEG file.

70. The system of claim 68, wherein the image data is a GIF file and the acceleration device is configured to reduce a number of colors of the GIF file.

71. The system of claim 68, wherein the image is animated and the acceleration device is configured to extract a frame from the animated image data.

72. The system of claim 71, wherein the extracted frame is a first frame of the animated image data.

73. The system of claim 72, wherein the animated image data is an animated GIF image and the acceleration device is configured to create the smaller version of the animated image data by a reduction of the number of colors in the first frame.

74. The system of claim 57, wherein at least a portion of the web resource is web page source data, the web page source data containing renderable data and non-renderable data.

75. The system of claim 71, wherein the acceleration device is configured to filter at least a portion of the non-renderable data from the web page source data, thereby creating modified web page source data, smaller in size than the original web page source data.

76. The system of claim 75, wherein the filtered portion of the non-renderable data includes whitespace.

77. The system of claim 75, wherein the filtered portion of the non-renderable data includes comments.

78. The system of claim 75, wherein the filtered portion of the non-renderable data includes hard returns.

79. The system of claim 75, wherein the filtered portion of the non-renderable data includes meta tags.

80. The system of claim 75, wherein the filtered portion of the non-renderable data includes keywords configured to be interpreted by a search engine.

81. The system of claim 75, wherein the acceleration device is configured to filter tags by rewriting tags of the web page source data in lowercase letters.

82. The system of claim 57, wherein the acceleration device is configured to compress the web resource in real-time before transmission to the remote client.

* * * * *